US011420713B2

(12) United States Patent
 Bastiyali

(10) Patent No.: US 11,420,713 B2
(45) Date of Patent: Aug. 23, 2022

(54) BUOY RESERVATION SYSTEM

(71) Applicant: Tarkan Bastiyali, New York, NY (US)

(72) Inventor: Tarkan Bastiyali, New York, NY (US)

( * ) Notice: Subject to any disclaimer, the term of this patent is extended or adjusted under 35 U.S.C. 154(b) by 319 days.

(21) Appl. No.: 16/842,618

(22) Filed: Apr. 7, 2020

(65) Prior Publication Data
 US 2021/0016856 A1 Jan. 21, 2021

Related U.S. Application Data

(63) Continuation of application No. PCT/US2020/027091, filed on Apr. 7, 2020.

(60) Provisional application No. 62/835,506, filed on Apr. 18, 2019.

(51) Int. Cl.
 *G06Q 20/40* (2012.01)
 *B63B 22/02* (2006.01)
 *G06Q 10/02* (2012.01)
 *H04B 7/15* (2006.01)
 *H04L 67/02* (2022.01)

(52) U.S. Cl.
 CPC ............. *B63B 22/02* (2013.01); *G06Q 10/02* (2013.01); *G06Q 20/401* (2013.01); *H04B 7/15* (2013.01); *H04L 67/02* (2013.01); *B63B 2203/00* (2013.01)

(58) Field of Classification Search
 CPC ...................................................... G06Q 20/40
 See application file for complete search history.

(56) References Cited

U.S. PATENT DOCUMENTS

2017/0240255 A1\* 8/2017 Waldrop ................... E02B 3/24
2020/0128353 A1\* 4/2020 Waldrop ............. G06F 16/2477

\* cited by examiner

*Primary Examiner* — Sulaiman Nooristany
(74) *Attorney, Agent, or Firm* — MG Miller Intellectual Property Law LLC

(57) ABSTRACT

A mooring buoy reservation system is disclosed. The system comprises a mooring buoy that has the ability to enable or disable a tie up point on the buoy. The buoy has a microprocessor in communication with a server. And the server is in communication with a boat device.

Also a method of a subscriber reserving a buoy through the server, paying for the buoy's use, and mooring to an enabled buoy is disclosed.

16 Claims, 15 Drawing Sheets

BUOY RESERVATION SYSTEM

BACKGROUND OF THE INVENTION

An average bay, more so in Europe than in the US, has buoys where captains can moor their boats. Mooring to a buoy is more secure than anchoring, and only a hurricane or nor'easter would the buoy-moored boat be in danger of ending up on the shore. Small boats, 35 feet or less, are most at risk for drifting when anchoring and buoys are the best solutions for captains to feel comfortable with leaving the boat and going ashore.

Buoy moorings are first-come-first-serve, and sailboats have a major disadvantage since they go only half the speed of a powerboat. If the captain arrives late to a bay and all buoys are taken, the captain must anchor, which is not as secure, and the boat could drift to shore if the weather gets windy. Often, boaters in Europe have to leave a beautiful bay early to get to their next destination early enough to secure a buoy for an overnight mooring.

Also, the process of collecting payments under the current system is very costly. The annual expenses alone to maintain the government boat that comes daily through the bay to collect payments could exceed $30,000. Sometimes you can't use a buoy if you don't dine at the restaurant located on the bay. Another issue with the current system is that when the boat owner is relaxing and enjoying the day, the fee collection boat could interrupt the boat owner. Instance fees are collected in cash; the boat owner must plan to have money on hand. Restaurants that operate bays in the US don't normally offer buoys, and boat owners must risk using their anchors.

This is so at Sunset Beach Shelter Island, for instance. And Sunset Beach is very deep in the center of the bay. Only large yachts that carry enough anchor chain can stay there, while smaller boats must anchor near the shore. The boats in this small-boat concentration risk colliding into each other if it becomes windy. The weather can turn windy at any time, including at night. Therefore, only large yachts overnight in the bay. If Sunset Beach offered buoys for boaters, boats of all sizes would stay there overnight. And they would spend money in the Sunset Beach Restaurant.

SUMMARY

An embodiment of the buoy reservation system comprises a server device with a processor, a boat device with a processor, and a buoy device with a processor. These components are in functional combination and are in signal communication with each other in some embodiments.

The buoy comprises a mooring point that can be enabled or disabled by a remote signal. For instance, the buoy device processor is in communication with the mooring point and with a server device.

The server device processor executes server software, the boat device processor executes boat device software, and the buoy device processor executes buoy-device software. The buoy-device software has the functionality to receive a remote signal from the server device to enable or disable the mooring point and to execute commands to cause the buoy to open or close or enable or disable.

In some embodiments, the server device software has the functionality to send and enable communication or a disable communication to the buoy processor in response to a reservation communication from the boat device processor. In some cases, the reservation communication comprises a buoy identifier.

The server can contain or access a database of reservable buoys and can contain or access a subscriber database that correlates subscribers with at least subscriber payment information and with boat devices. In some versions, the buoy has local controls and can contain a Wi-Fi device (including a repeater device), solar cells, video screens, etc.

In some versions, signal communications travel over the internet.

In some embodiments, the system additionally has a buoy owner device with a buoy owner device processor in signal communication with the buoy device processor, the boat device processor, or the server device processor. Also, a method of a subscriber reserving a buoy through the server, paying for the buoy's use, and mooring to an enabled buoy is disclosed.

DETAILED DESCRIPTION

Figure 1:
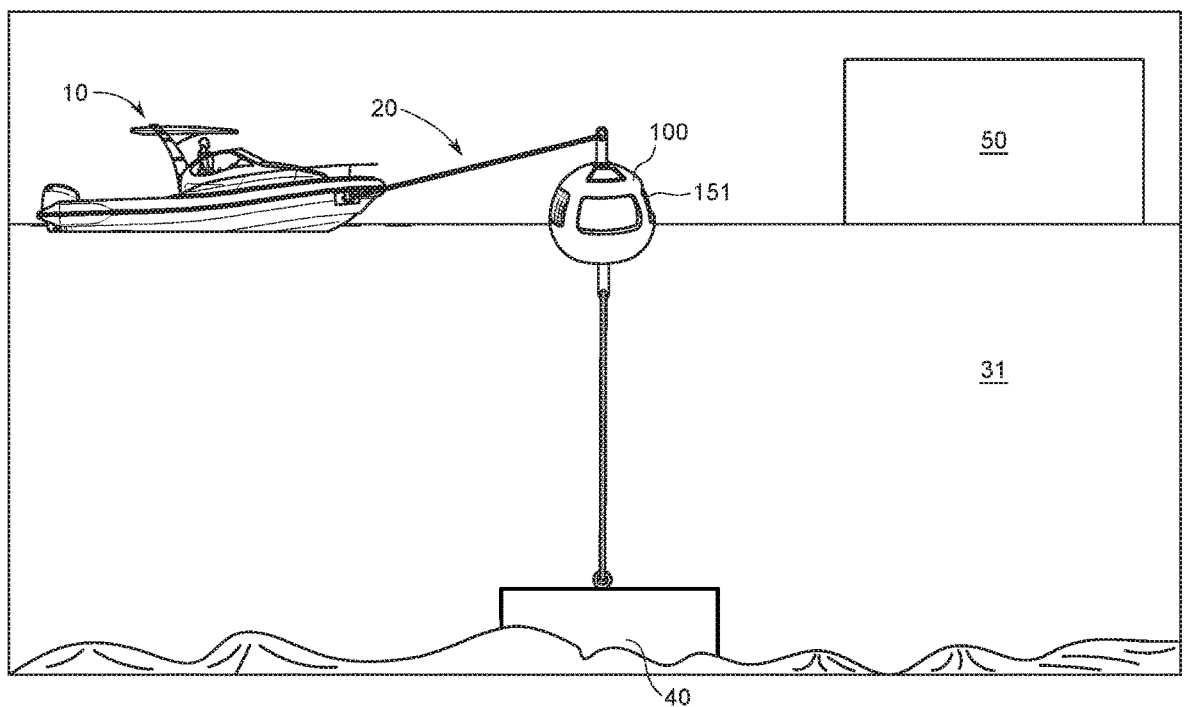
FIG. 1 is a cross-section of a bay.

Embodiments of the current invention provide a buoy reservation system. In some embodiments, a reservation is accomplished through device software running on a boat device. The boat device can be an iPhone or other smartphone or can be associated with a specific boat. In some embodiments, the app operating the boat device functionality will display the geographical location of the bay and perhaps show or number the buoys. When the boater is on the buoy app, the app can display a map showing the current latitude and longitude of the bay. FIG. 1 shows the details of the bay with numbered buoys. More desirable buoy locations can be charged at a higher rate, and less desirable buoy locations can be charged at a lower rate. Restaurants could install the buoys and then charge for their use including giving discounts at the restaurant.

Governments operating in bays would be able to charge a fee for the mooring time, such as a lunch-time or overnight mooring. For instance, the government could charge a small fee of $25 from 7:00 am to 1:00 pm, $50 from 1:00 pm to 7:00 pm, and $100 for overnight mooring.

In some embodiments, the boat device can place reservations further into the future. The server device can operate a database of reservable buoys that could be maintained for geographical areas, including a database containing reservable buoys worldwide. Also, in some embodiments, if the boater had a specific buoy in mind, but that buoy is already booked for the boater's desired date, the boater could place his or her name on a waiting list.

In some embodiments, restaurant owners can generate income by offering other services to the boaters, using the boat device app. For instance, boaters reserving a buoy could first book the buoy location and then could also jet skis or other services using the boat-device app or software. In some embodiments, having the functionality of the app could allow reserving's equipment independent of whether the boater d a buoy or not. In various embodiments, these services include reserving skis from the beach club or ordering pastries delivered to the boat from the restaurant. The app could be used to order water, as well. In various embodiments, through the boat device app, the boater can order or reserve:

jet skis
canoes and related equipment.
canoe-polo equipment and lessons
kayaks
paddleboards
tubes or banana boats
water bikes
glass-bottom boats
kiteboarding equipment or lessons
kite surfing equipment or lessons
bodyboard or lessons
fishing equipment
flyboarding equipment or lessons
wind-surfing equipment or lessons
knee boarding equipment or lessons
parasailing equipment or lessons
paddle boarding equipment or lessons
picigin ball
beach volleyball
aqua-jogging lessons
diving lessons
rafting or lessons
rowboat
yacht racing lessons
skimboarding equipment or lessons
standup paddle boarding equipment and lessons
skurfing equipment and lessons
wakeboarding equipment and lessons
cable skiing and lessons
water polo equipment, goal nets, and ball
wake surfing equipment and lessons
water skiing equipment and lessons
barefoot skiing equipment and lessons
snorkel gear
surf instructor Restaurants or marinas could provide services such as:
water taxi pickup to go to shore
dinner on the beach
dinner at the restaurant
fresh pastries delivery to the boat
ice cream boat visits
dry cleaning services
grocery delivery services

DETAILED DESCRIPTION

A list of components referenced in this disclosure follows:
boat 10
mooring line 20
bay 31
buoy anchor 40
marina 50
anchorage buoy 100
buoy housing 105
mooring point 110
eyelet 111
sleeve 112
local controls 115, 115'
solar cells 130
video screen or lights 151
rod 155
gaff pole 165
gaff pole hook 166
slot 220
actuator 221
receiver 222
hasp 225
server device 400
boat device 410
buoy device 420
server-boat path 430
server-buoy path 440
boat-buoy path 450
Cover or lid 610
hinge 611

In some embodiments, if a boat owner does not move or release the buoy by the end of the reservation time, an additional fee could be charged. This could be done in a variety of ways, including using a camera overlooking the bay or with a drone. A penalty could be enforced by showing the current time with the boat present or still tied to the buoy after the time of departure. When a reservation holder complains about another boat remaining in the reservation time, the boat owner could send an image to the main office with a timestamp, etc. When a drone or other system camera records that the boat hasn't departed, the system can automatically charge the boaters reserve my buoy account, similar to what is done with "no-shows" in other industries. In some embodiments, the reservation system accepts a credit card, debit card, wire transfer, bitcoin, or PayPal payment, for instance.

FIG. 1 represents a schematic drawing of a cross-section of a bay in front of a marina.

Boat 10 is shown moored through mooring line 20 to anchorage buoy 100. Anchorage buoy 100 is anchored to the bottom of the bay 31 through buoy anchor 40 represented with an anchor symbol. In most cases, the actual buoy anchor is a large concrete block sitting on the floor of the bay. Marina 50 provides assorted services to boaters, which can include restaurant services laundry services etc. In an embodiment of the invention, marina 50 provides the ability for a boater to make a future reservation of this or numerous other anchorage buoys 100.

In the simplest embodiments, buoy device or client 420 (FIG. 7) responds to a wired or wireless signal from server device 400 to enable or disable mooring point 110. A lockable mooring point facilitates disabling mooring point 110. For instance, in some embodiments, configurable mooring point 110 communicates with buoy device 420 such that buoy device 420 can generate signals to enable or disable mooring point 110. Buoy 100 is much like a standard anchorage buoy as is typically used in marinas or harbors but also has configurable mooring point 110. For clarity, an enabled mooring point is a mooring point that is configured for use as designed. A disabled mooring point is a mooring point that is not configured for use as designed. In other words, access to the mooring point is prevented. When a mooring point is disabled it is in a mooring disabled configuration.

Enabling or disabling can be implemented by any of a variety of techniques.

Figure 2A:
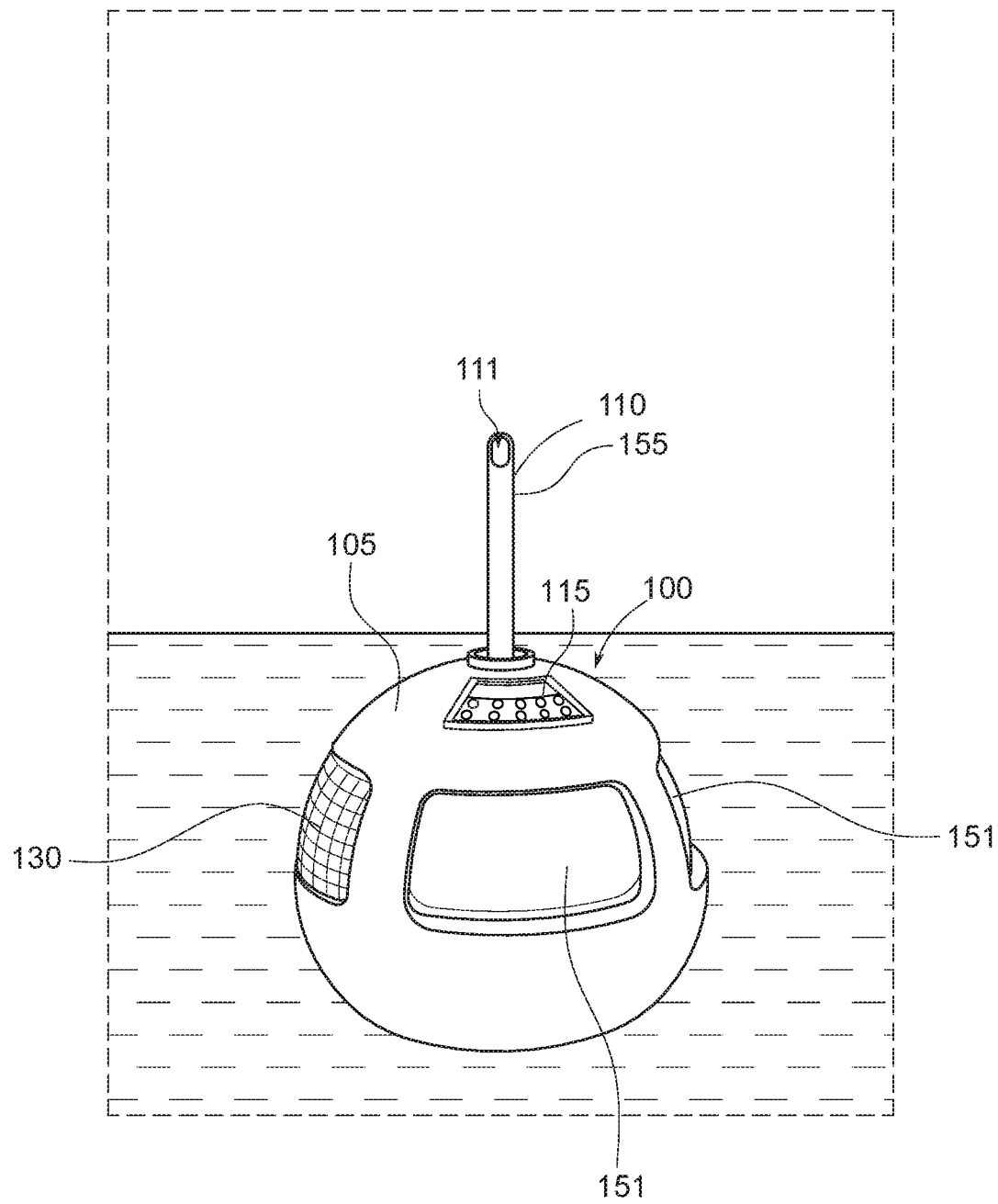
FIG. 2A is a front perspective view of a mooring buoy of an embodiment of the system.
Figure 2B:
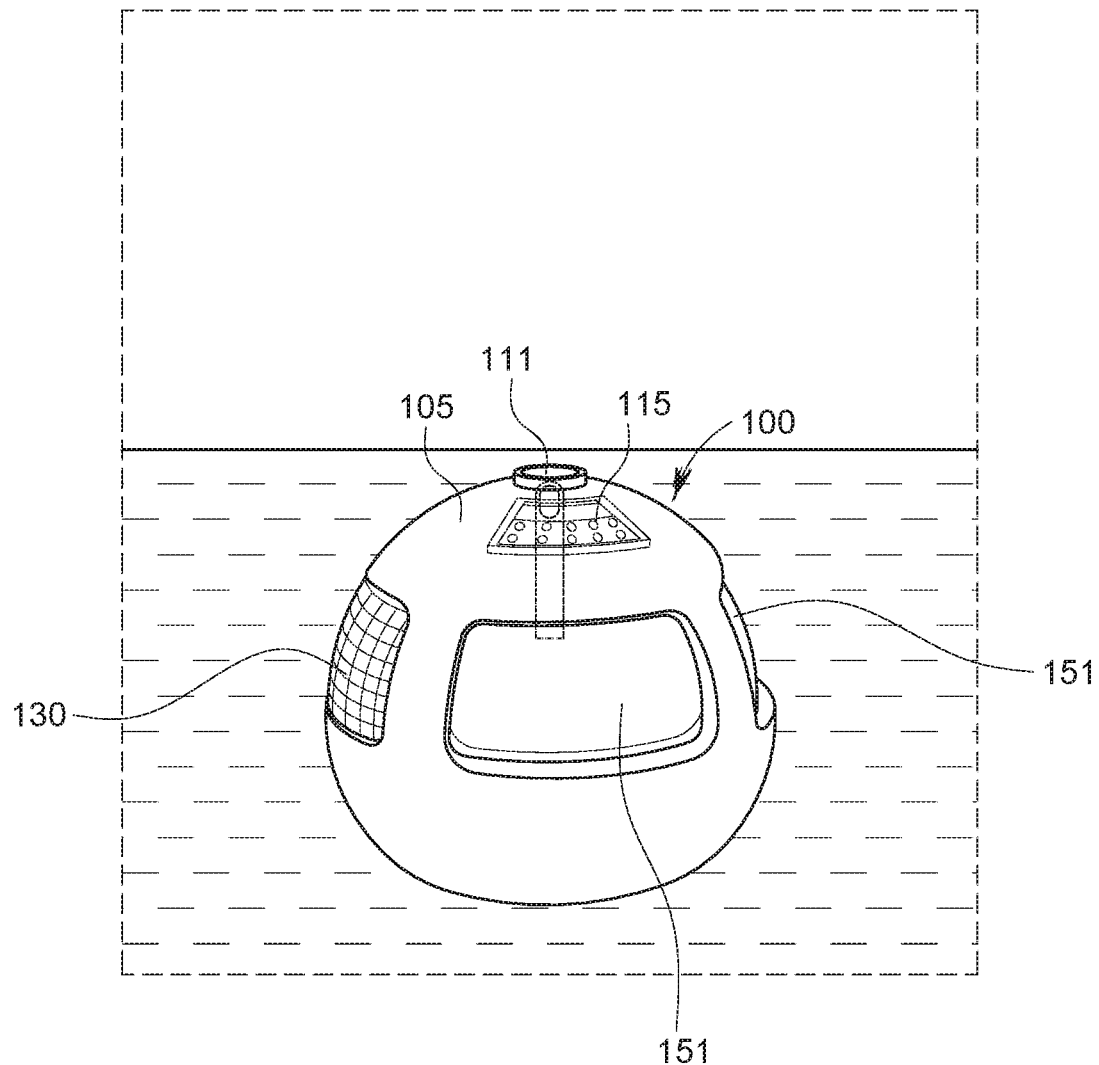
FIG. 2B is a front perspective view of the mooring buoy of the FIG. 2A.

FIG. 2A depicts an anchorage buoy 100. In this embodiment, buoy 100 has rod 155 extending upward out of buoy housing 105. In this instance, rod 155 has mooring point 110 located on the top. FIG. 2B shows buoy 100 of FIG. 2A except that rod 155 is retracted.

Figure 3A:
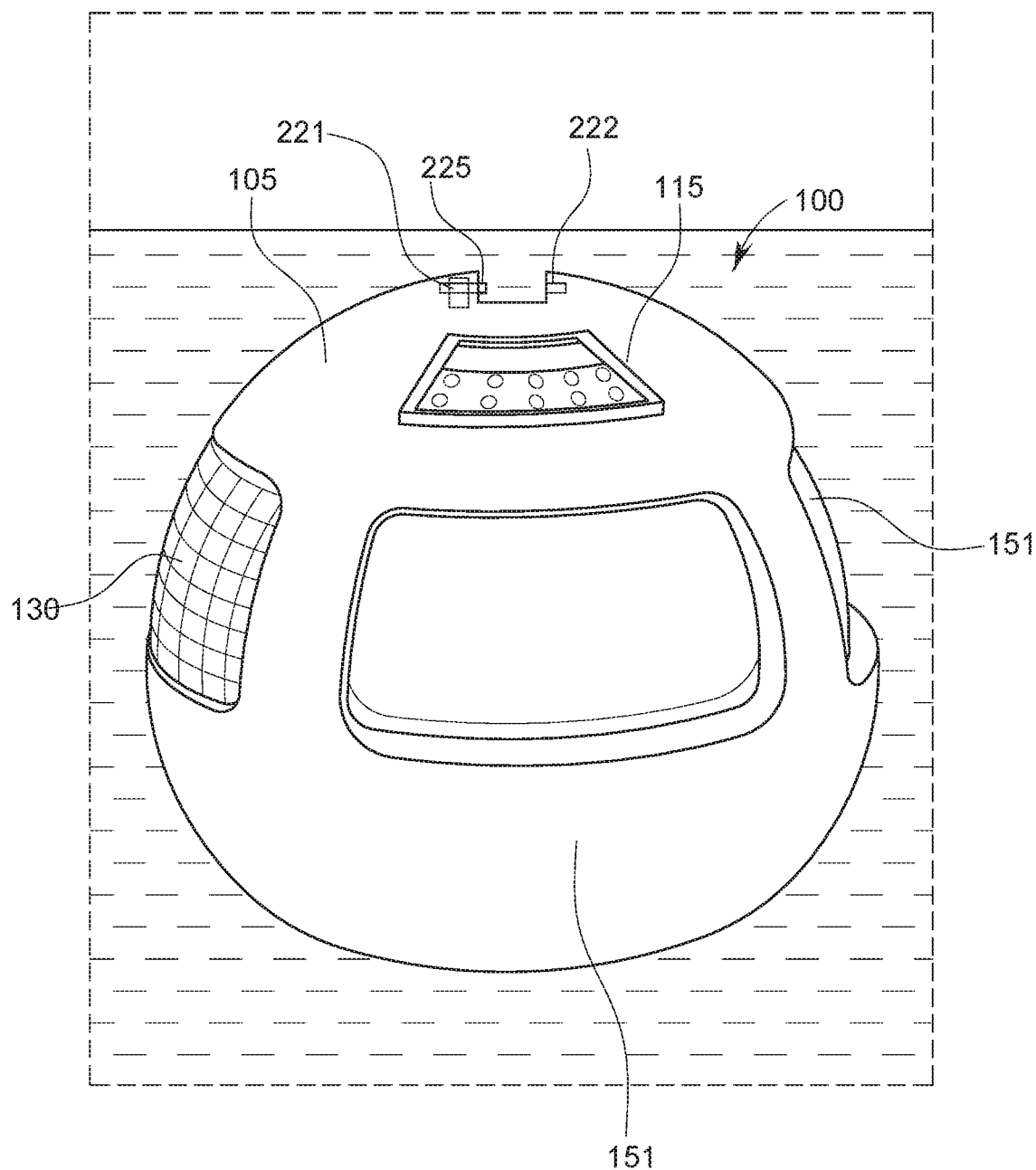
FIG. 3A is a front perspective view of a mooring buoy of another embodiment.
Figure 3B:
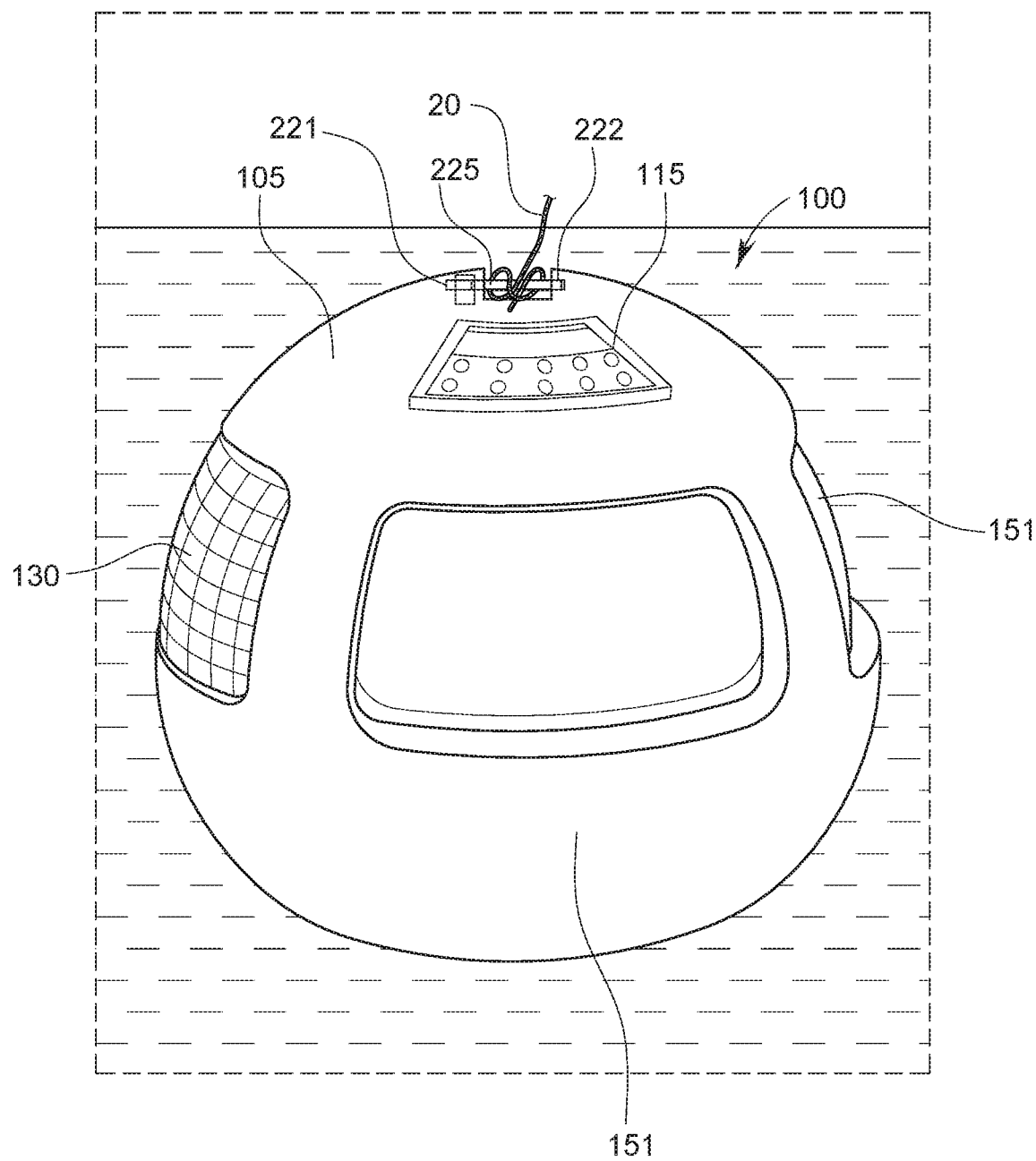
FIG. 3B is a front perspective view of the mooring buoy of the FIG. 3B.

Mooring point 110 can be internal to buoy 100, such as with slot 220 in FIG. 3A. In this type of embodiment, hasp 225 is movable from an open (FIG. 3A) to a closed (FIG. 3B) position by retracting into buoy 100. In the open position, slot 220 is empty, unable to accept the mooring line. But in the closed position, hasp 225 extends across slot 220 and can accept the mooring line. This type of embodiment is seen in FIG. 3B, which shows hasp 225 open. Actuator 221 is the mechanical part that opens and closes hasp 225. In the embodiments shown in FIG. 3A and FIG. 3B, hasp 225 extends across slot 220 into receiver 222.

Figure 4A:
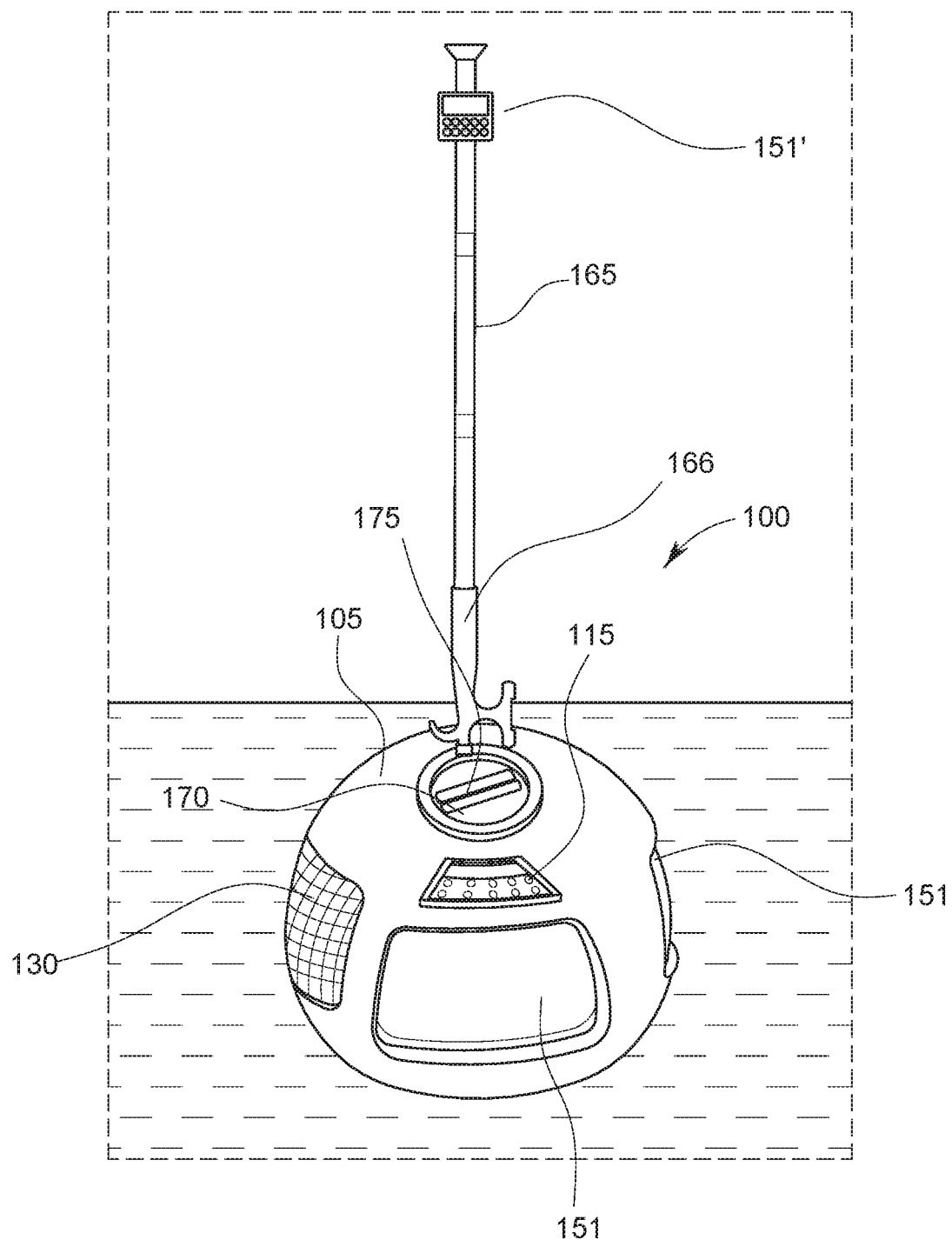
FIG. 4A is a front perspective view of a mooring buoy of another embodiment.
Figure 4B:
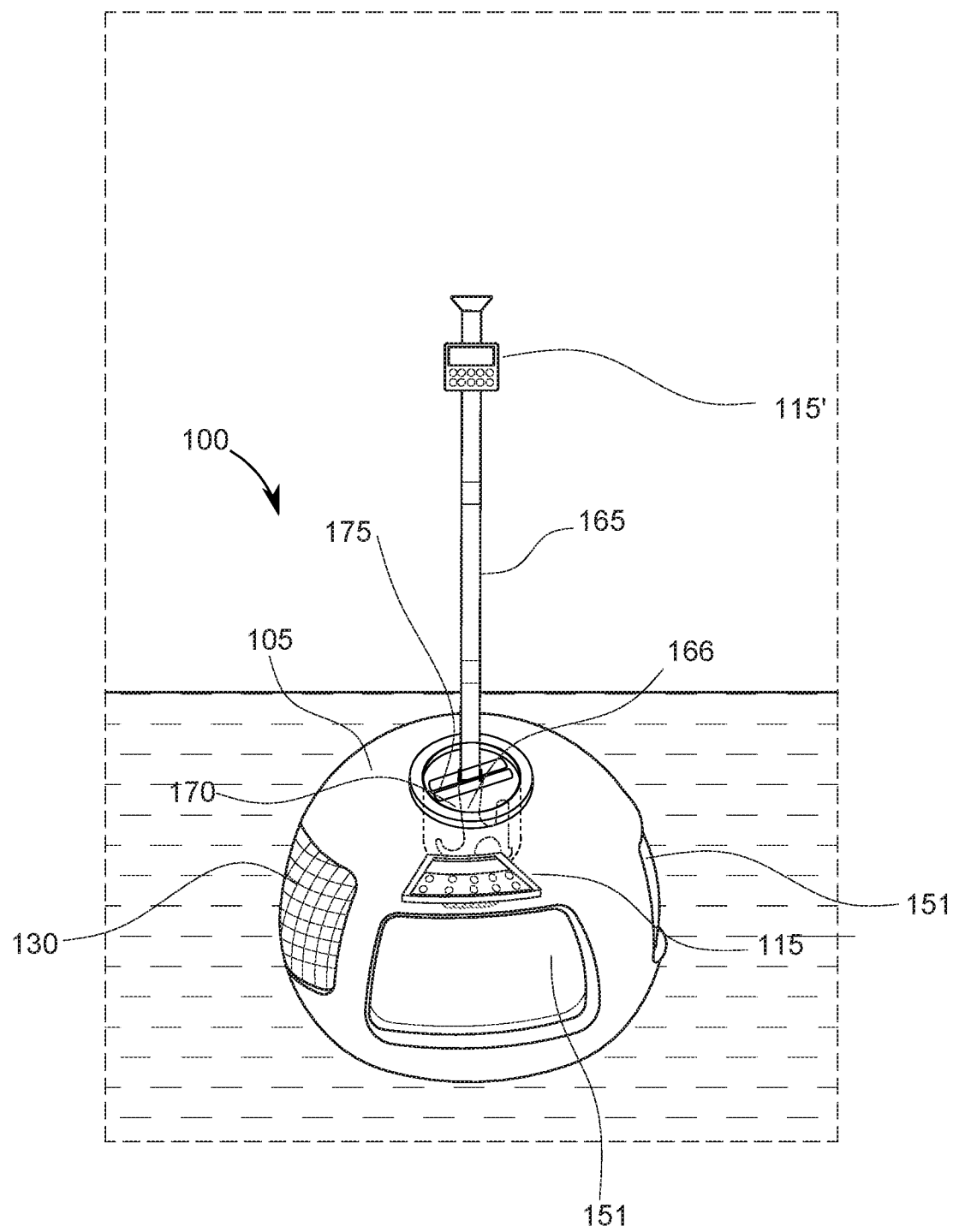
FIG. 4B is a front perspective view of the mooring buoy of the FIG. 4A.
Figure 4C:
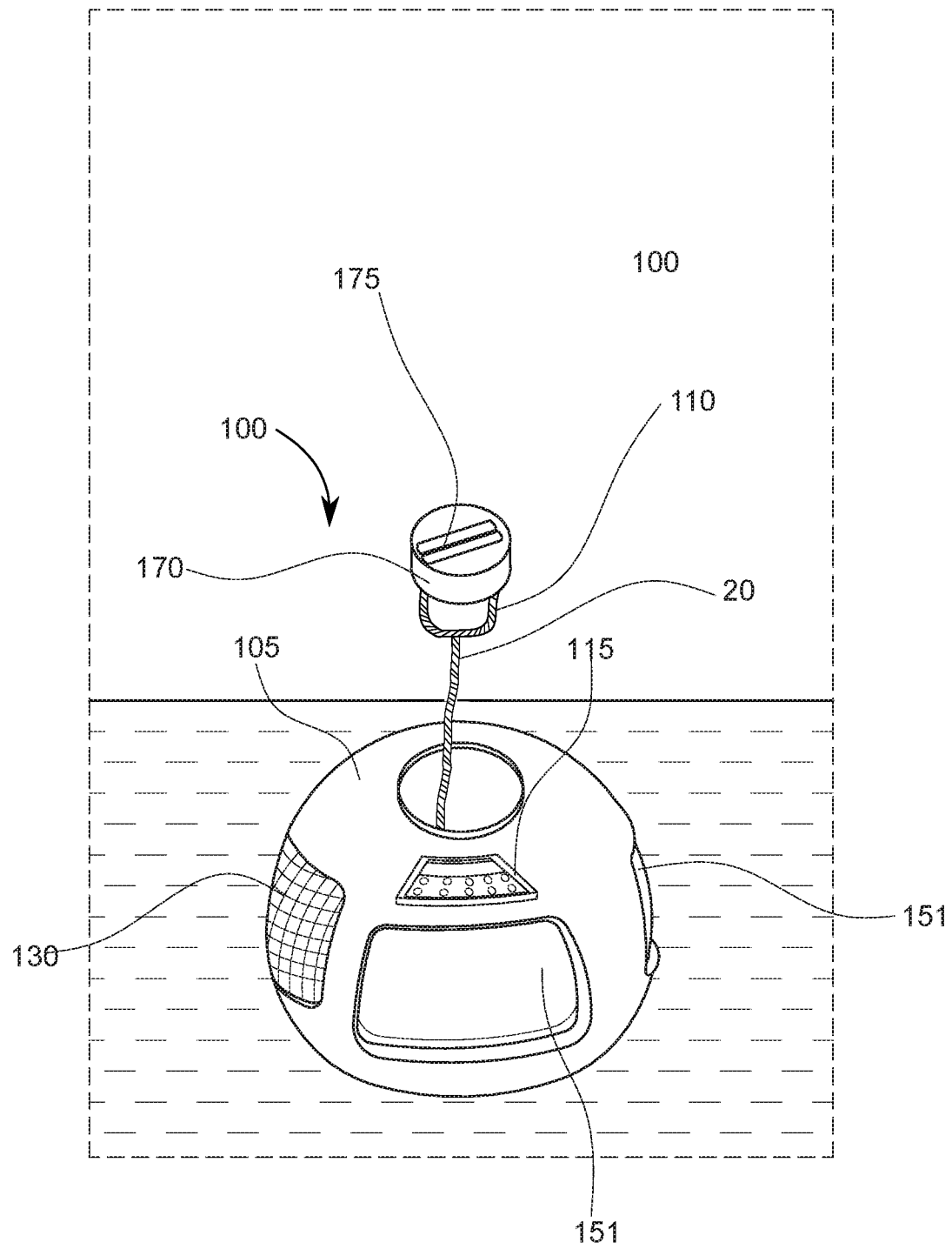
FIG. 4C is a front perspective view of the mooring buoy of the FIG. 4A.

FIGS. 4A, 4B, and 4C depict another embodiment of buoy 100. In this embodiment, mooring line 20 sits inside of buoy 100 connected to buoy 100. Mooring line 20 also connects to mooring point 110, which in this embodiment is a loop of rope or other cordage connected to mooring point cover 170. Mooring point cover 170 comprises slot 175 for receiving a gaff pole 165. Gaff pole 165 has gaff hook 166. In some embodiments, gaff pole 165 also comprises local control panel 115', which makes it a smart pole.

Mooring point cover 170 locks into buoy 100 when buoy 100 is reserved or if it is available, but the fee for using it has not been paid. (Both of these situations will be referred to as "reserved" for this document.) The buoy 100 that is requested to be reserved or is reserved is sometimes called a target buoy. Reserved buoy 100 unlocks upon receiving the correct signal from pole 165, input into local control 115, or through wireless communication through server-buoy path 440 or boat buoy path 450, as discussed below. For instance, in some embodiments, the system will generate a combination or a reservation number and send it to the customer. The customer uses this number to authenticate their permission to use buoy 100. Authentication can occur using control panel 115", as well.

The locking system can be of any well-known type. For instance, cover 170 is rotatable in some versions of the system.

In use, the version of buoy 100 shown in FIGS. 4A, 4B, and 4C receives a combination or reservation number, which authenticates the user. Software instructions running on a computer associated with buoy 100 cause the locking system to unlock. Once unlocked. cover 170 becomes removable. When the user removes cover 170, mooring line 20 and mooring point 110 become accessible for mooring the user's boat. In some versions, gaff hook 166 fits into slot 175 in cover 170 facilitating removal of cover 170. For instance, gaff pole 165, after entering slot 175 allows cover 170 to be turned which causes the locking system to release cover, 170.

When boaters leave the buoy, they can pull the rope up when untying it. And in some embodiments the rope has a retraction mechanism to wind the rope back into the buoy (such as with a retracting seatbelt). Once the cap retracts in, the light on the numbered buoy will change to indicate its new status. In some embodiments the light changes to green to signal that the buoy is available.

Figure 5A:
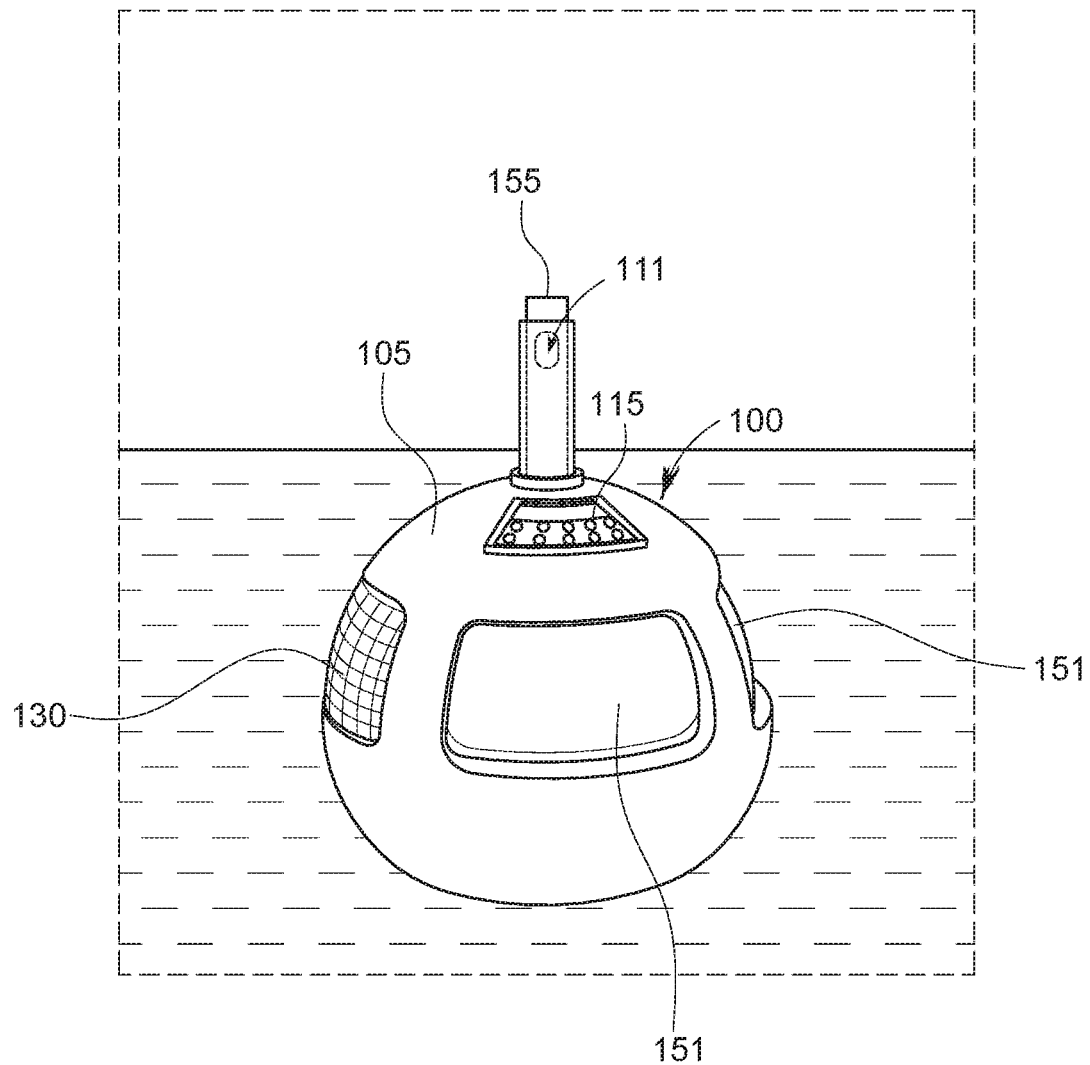
FIG. 5A is a front perspective view of a mooring buoy of another embodiment.
Figure 5B:
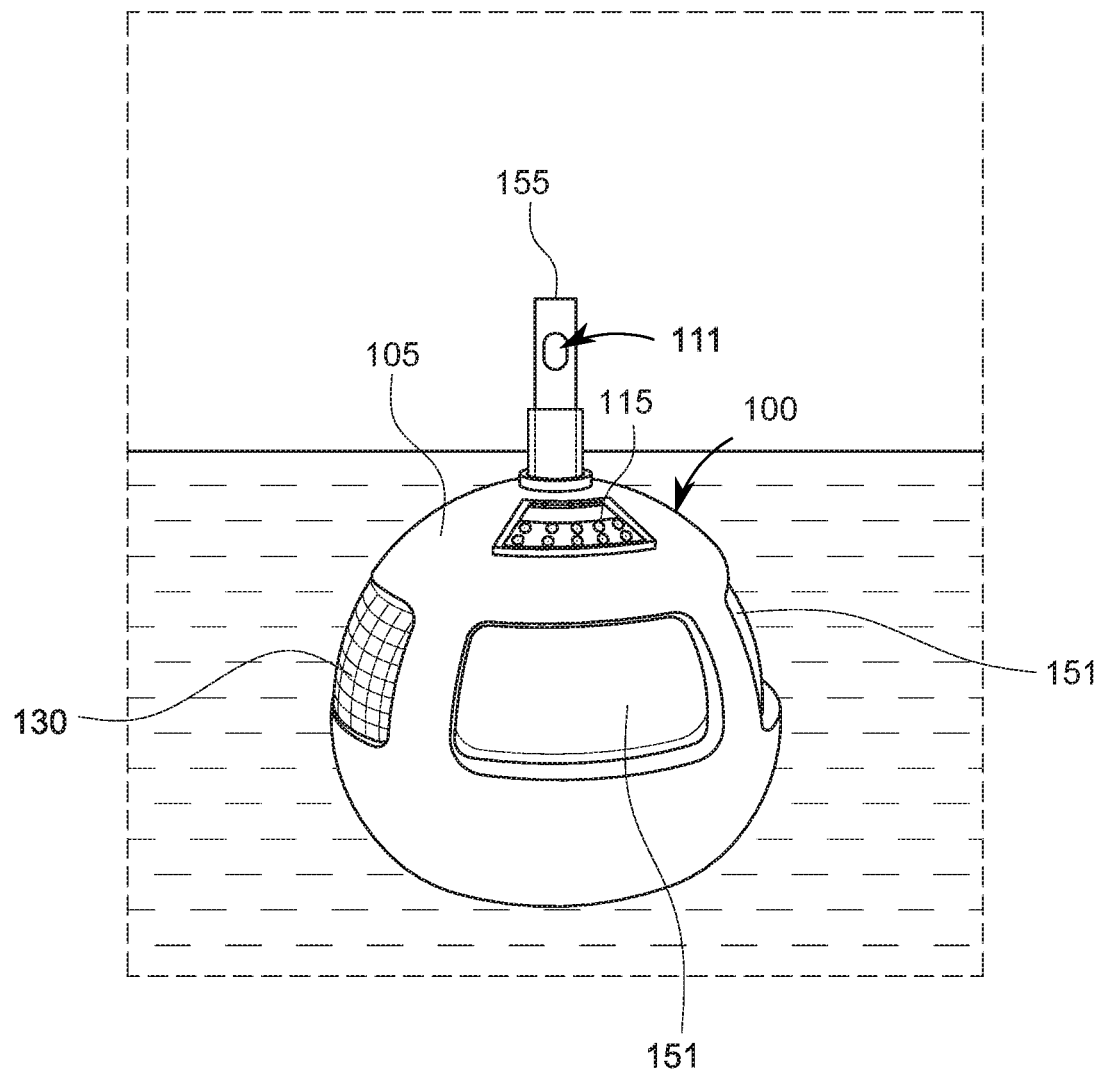
FIG. 5B is a front perspective view of the mooring buoy of the FIG. 5A.

Eyelet 111 is designed to receive mooring line 20. Such an embodiment is shown in FIG. 5A. To disable this version of mooring point 110, sleeve 112 extends out of housing 105 around mooring point 110, blocking access to eyelet 111, as shown in FIG. 5A. FIG. 5B illustrates buoy 100 with sleeve 112 retracted, allowing access to mooring point 110.

Figure 5C:
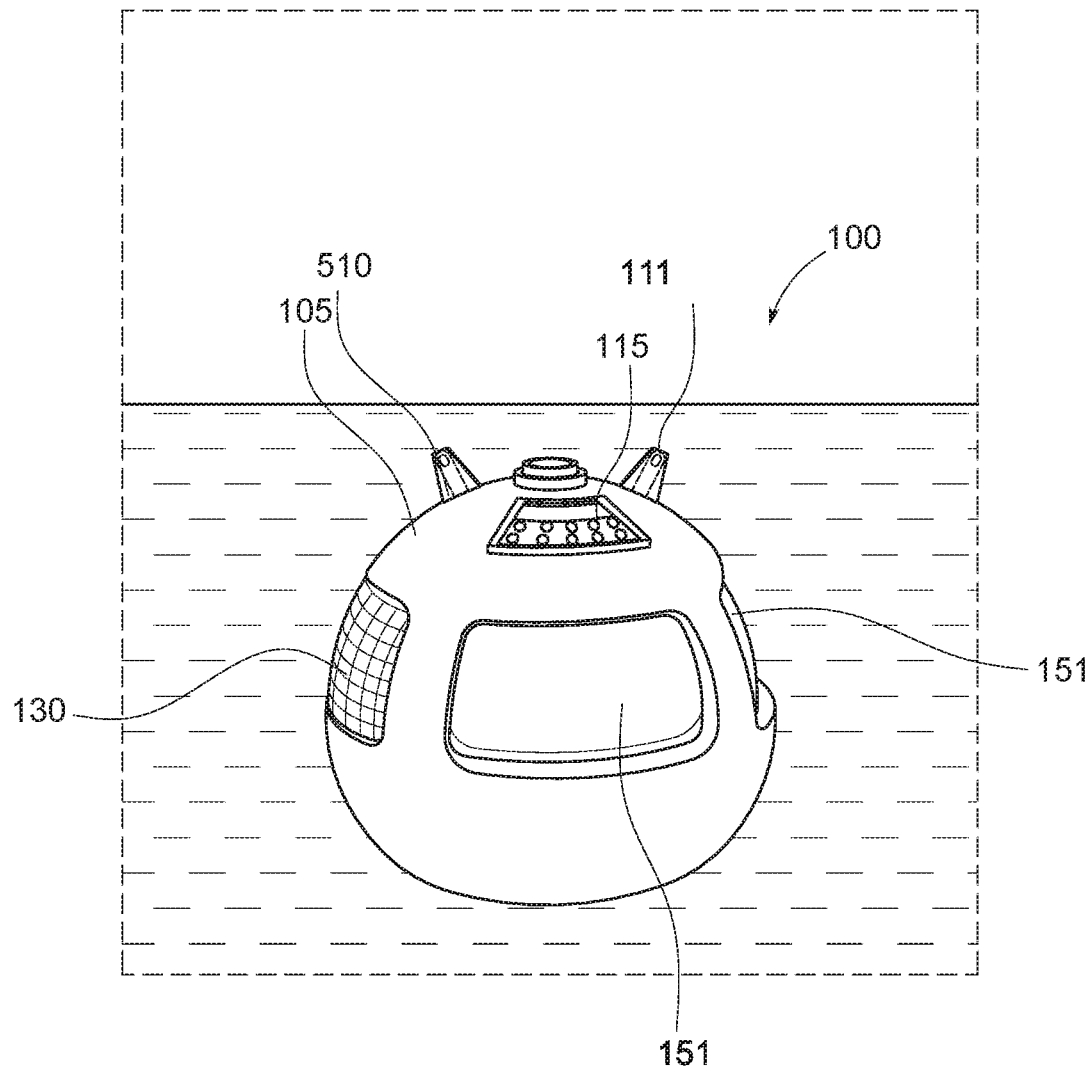
FIG. 5C is a front perspective view of the mooring buoy of the FIG. 5A.
Figure 5D:
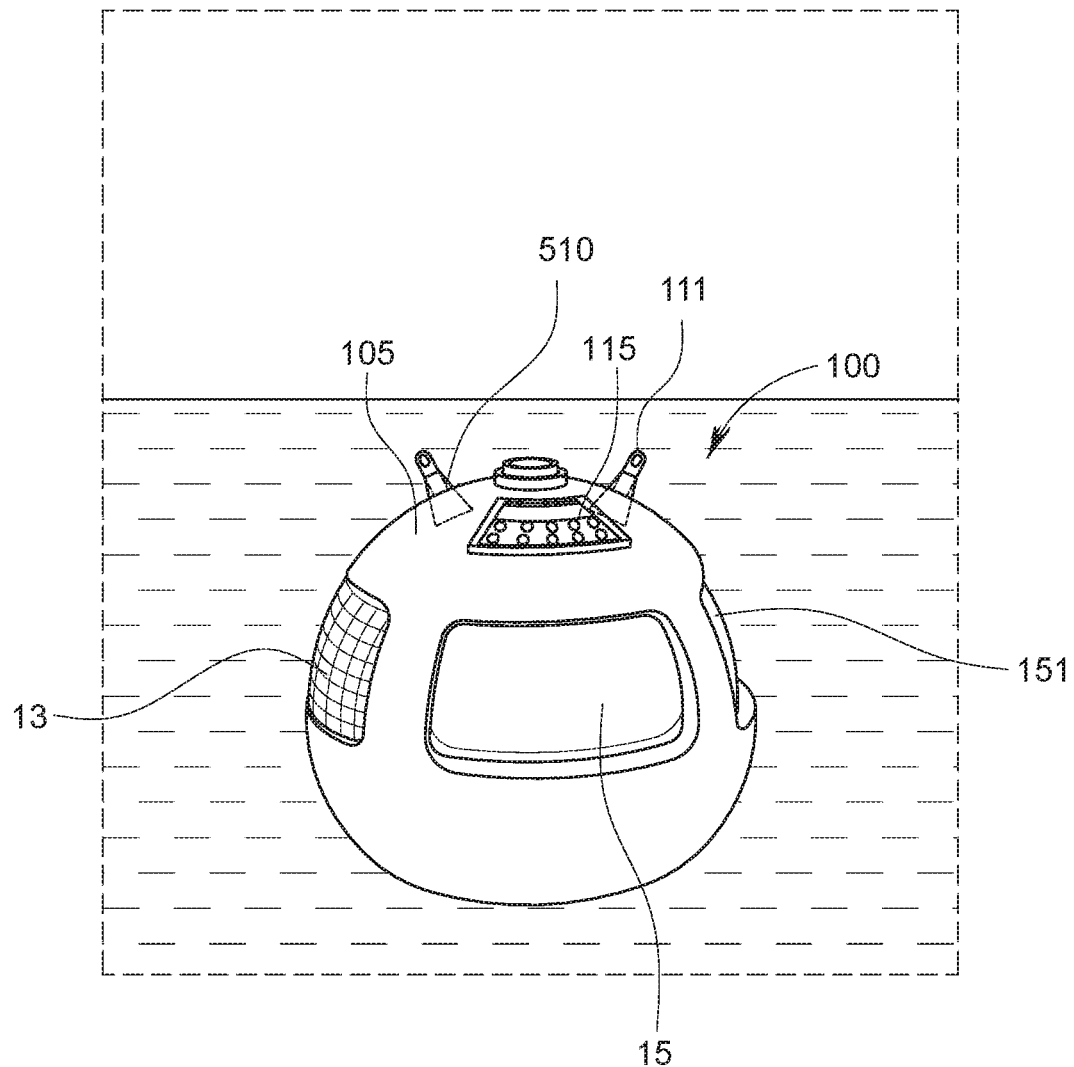
FIG. 5D is a front perspective view of the mooring buoy of the FIG. 5A.

FIG. 5C depicts buoy 100 according to an embodiment of this disclosure having two mooring points 110. FIG. 5C depicts mooring point 110 retracted so that mooring points 110 are disabled inside of cones 510. FIG. 5D depicts mooring points 110 extended buoy 100 through cones 510 and thus enabled.

Figure 6A:
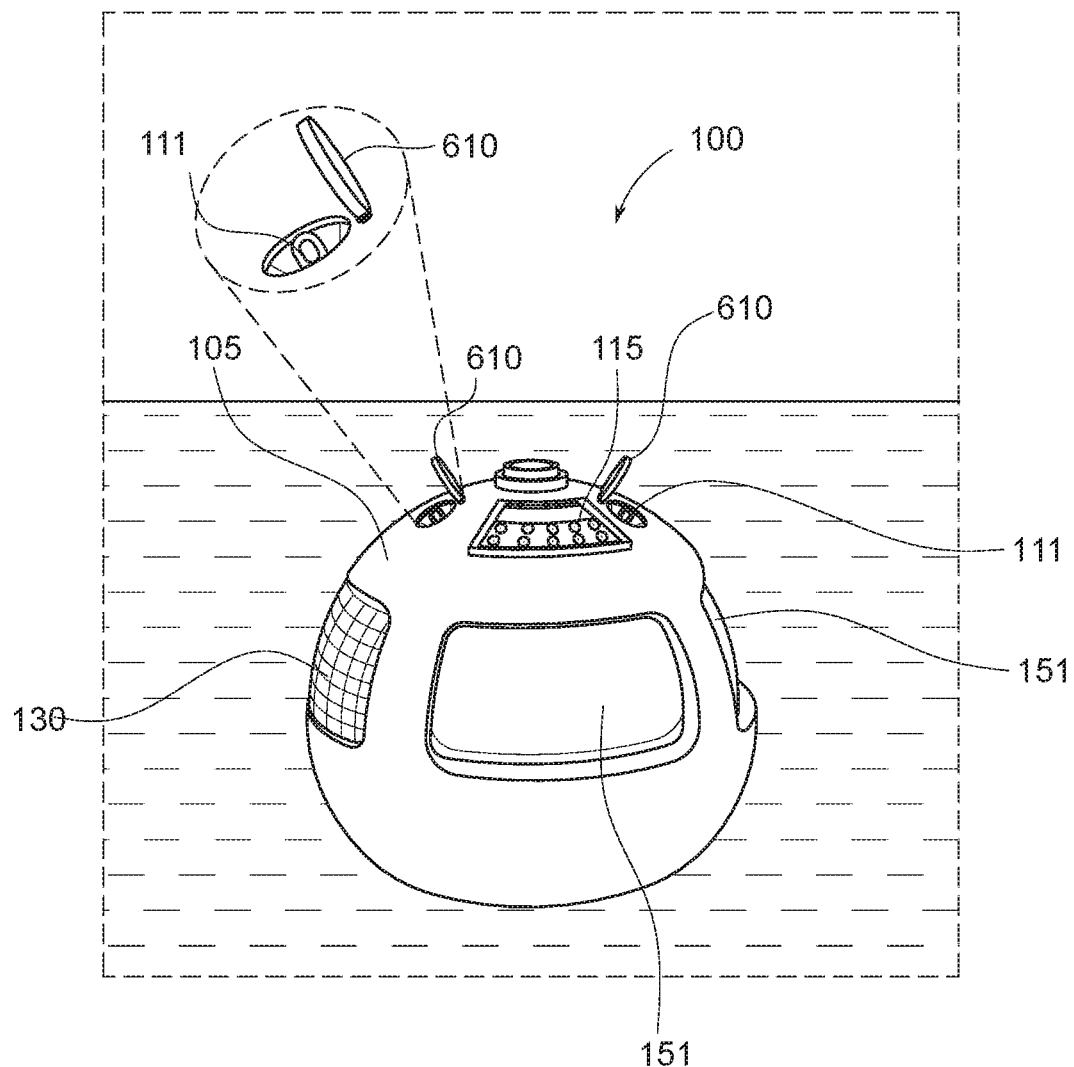
FIG. 6A is a front perspective view of a mooring buoy of another embodiment.
Figure 6B:
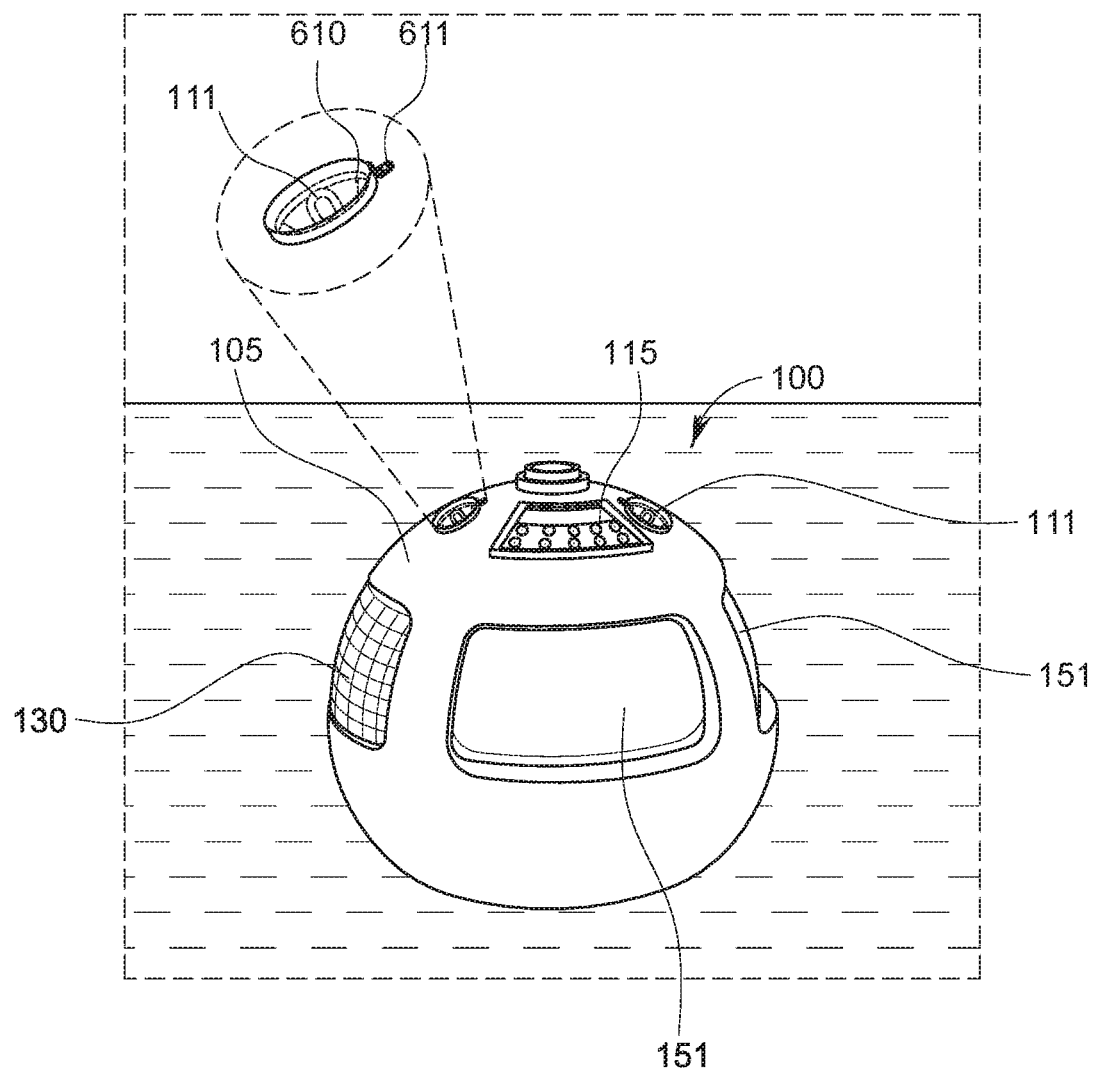
FIG. 6B is a front perspective view of the mooring buoy of the FIG. 6A.

FIG. 6A depicts another embodiment of buoy 100. In this case, mooring point 110 is disabled or set in a mooring disabled configuration by covering it with cover or lid 610. FIG. 6B shows buoy 100 with cover 610 closed, preventing access to mooring point 110. In some systems, cover 610 attaches to buoy housing 105 using hinge 611.

Eyelet 111 is not always round. One effect of anchorage buoy 100 of the current invention is that anchorage buoy 100 can be selectively configured to keep a boat from mooring to it.

In some embodiments, buoy 100 comprises solar cells 130 to provide power. Embodiments with solar cells 130 on buoy 100 are shown in FIG. 4A and FIG. 4B. Some embodiments have a battery and an inverter. In some embodiments, the battery and inverter connect to the solar cells 130. In some embodiments, solar cells 130 supply energy to illuminate lights or indicator lights on buoy 100.

Mooring point 110 enables or disables in response to a signal generated by buoy device 420. In some versions, anchorage buoy 100 contains external, local controls 115 for direct input into buoy device 420. In some embodiments, buoy 100 comprises video screen or lights 151. This allows communication between the user and buoy 100. Video screens 151 can communicate through displaying text or can take solid colors to indicate the status of buoy 100 to a boater from a distance. In some versions, when the user time is almost up, the buoy or one or more video screens around the circumference of buoy 100 switch to a yellow colored light or monitor screen. See FIG. 4A, 4B, or 4C for embodiments having lights 151 In these or other embodiments, once the gaff pole 165 enters slot 175 and rotates cover 170 some amount, such as a full turn, buoy 100 could switch to a red colored light or monitor screen communicating that buoy 100 is booked. When buoy 100 is available for purchasing a mooring, buoy 100 could switch to a green colored light or monitor screen communicating that buoy 100 is available. In some embodiments, buoy 100 will display yellow to indicate to the boater that the reserved time was almost up. These or other colors could signify any number of different pieces of information. For instance, display colors could be used to indicate that a buoy was reserved or that a reservation would begin soon. In some embodiments, the buoy could illuminate yellow lights once a boater had reserved it using the app.

In some versions, once a boat approaches, buoy 100 could switch to showing printed instructions on one or more screens until the process is complete. After that buoy 100 could switch to a red colored light or monitor screens.

Figure 7:
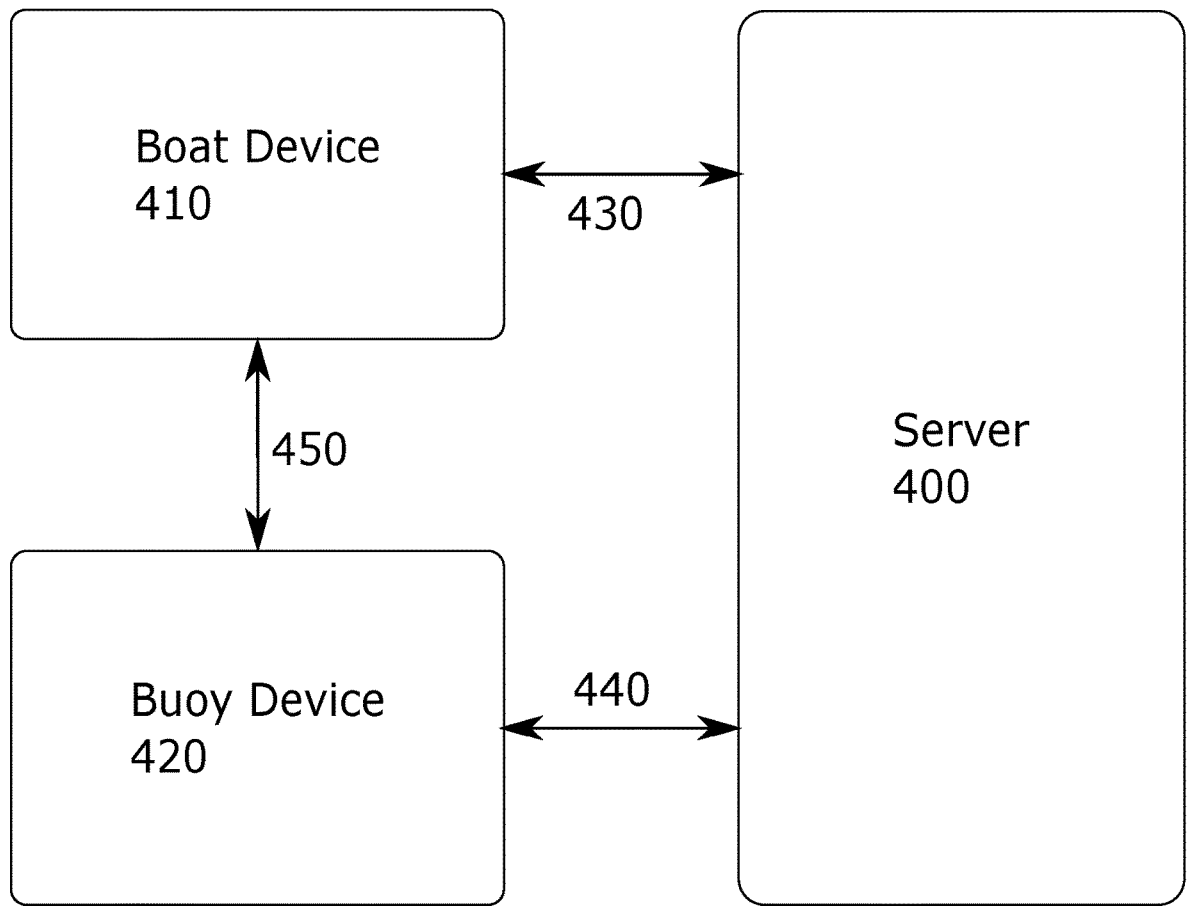
FIG. 7 is a block diagram of the software operating in the buoy reservation system.

FIG. 7 represents the communication components of an anchorage reservation system according to an embodiment of the invention. Server device 400 is in communication with boat device 410 and buoy device 420 through server-boat path 430 and server-buoy path 440, respectively. Server device 400, boat device 410, and buoy device 420 each contains a processor operating software that provides appropriate functionality. In some embodiments, boat device 410 and buoy device 420 can communicate directly through boat-buoy path 450.

Server-boat path 430, server-buoy path 440, and boat-buoy path 450 are implemented in a variety of ways including all wired and suitable wireless modalities: internet connections through land paths, mobile phone communication, satellite internet, or other satellite-based wireless communication, satellite text messaging, ship-to-shore communication, any useful onboard communication, etc. As will be discussed below, this connection can be through a local area network centered on a marina or other bay or harbor service provider. Sometimes these service providers will host server device 400. Communication could occur through any type of wide-area network.

In some embodiments, the system includes multiple server devices 400 in communication with each other operated by the same or different entities. As is typical for client devices, some embodiments of the system use multiple boat devices 410. In these or other embodiments, the system uses multiple buoy devices 420.

In some embodiments, server device 400 operates on a multipurpose marina computer, such as a computer running Apple OSes, Windows, Linux, or any other OS. In some embodiments, server device 400 is a virtual device running computer instructions implementing server-side functionality for the system. In some embodiments, server device 400 operates on special purpose computers operated by the marina, by a local entity, or by another third party.

In some embodiments, boat device 410 is any boat device 410 temporarily or permanently associated with a boat 10. An example of boat device 410 temporarily associated with a boat is a mobile phone running boat device 410 software instructions, including reservable buoy boat client-side software. Of course, operators of the system could provide purpose-built boat devices 410 that would be carried by boat users rather than being part of the boat. An example of boat device 410 that is permanently associated with a boat is any computer installed on boat 10 capable of running boat device 410 software.

In some embodiments, the system operator provides purpose-built boat devices 410 that are designed to be installed or associated with a boat 10. For instance, a general or special purpose computer installed in a boat capable of running boat device 410 software is useful as a boat device 410. These could be sponsored by the system operator, including the free distribution of special purpose computers operating boat device 410 software compatible with the sponsor's system.

Buoy device 420 resides inside of buoy 100. In some embodiments, buoy device 420 resides inside of a waterproof compartment in buoy 100. Local controls 115 are in communication with buoy device 420, which in some embodiments, buoy device 420 receives local input through local controls 115.

Operationally, server device 400 communicates with buoy device 420, causing buoy device 420 to disable mooring point 110. Users of boat device 410 interact with boat device 410. Part of this interaction includes allowing the user to reserve an anchorage buoy 100 like this. In some embodiments, boat device 410 generates a reservation communication, a signal or message, and sends it to the server device 400. The reservation communication includes the subscriber ID associated with boat device 410 and buoy ID of the desired buoy. Server device 400 operates software instructions to determine if anchorage buoy 100 is available for reservations. If anchorage buoy 100 is available for reservation, server device 400 sends a message to buoy device 420 to do one or more of a variety of things. Potential responses include illuminating light 151 to indicate that buoy 100 is reserved, disabling mooring point 110 (unless mooring point 110 is occupied) causing mooring point 110 to remain disabled, illuminating light 151 to indicate to the moored vessel that buoy 100 now reserved, and generating a message to server device 400 that buoy 100 is currently in use. To do this, buoy device 420 would have the functionality to determine whether mooring point 110 was in use.

Additionally, buoy device 420 may also provide a wireless repeater for Wi-Fi signals to or from boat 10, in some embodiments. This would allow boat device 410 to have improved communications with the marina operator. These communications could be used to allow boaters to order or reserve services from the marina or the marina restaurant, and in some embodiments, these communications could go through boat device 410.

After sending the reservation communication or concurrent with sending the reservation communication, server 400 operates software to charge the subscriber for boat device 410. After the subscriber for boat device 410 reaches the reserved buoy, boat device 410 sends an arrival communication to server 400. Server 400 generates an "enable" communication and sends it to buoy device 420. The "enable" communication contains information to cause buoy device 420 to send a signal to mooring point 110, causing it to enable mooring, transition to a mooring enabled state.

Alternatively, boat device 410, after arrival, could generate an arrival communication to buoy device 420 that contained information for buoy device 420 to register the arrival and could contain the subscriber ID received from boat device 410. With this information, buoy device 420 could verify that the correct boat device 410 was requesting that buoy device 420 enable mooring point 110. For example, buoy device 420 could send an inquiry communication to server 400 to verify boat device 410 held the reservation. Alternatively, the message that server device 400 originally communicated that buoy device 420 was reserved could contain the subscriber ID of boat device 410.

Those of ordinary skill in the art will recognize that there are myriad ways to sequence the communications between the three devices to ensure that the correct subscriber claimed the reserved buoy.

What is claimed is:

1. A buoy reservation system comprising:
a server device comprising a processor;
a boat device comprising a processor; and
a buoy device comprising a processor, wherein the server, boat, and buoy devices are in signal communication with each other;
the boat device processor sending a reservation communication having a buoy identifier of a target buoy and a subscriber identifier of the subscriber to the server device processor;
the server device processor reserving the target buoy for the subscriber;
the server device sending a disable communication to the buoy device processor of the target buoy, wherein the buoy device processor is in signal communication with a lockable mooring point on the buoy device;

the buoy device processor causing the mooring point to enter a mooring disabled configuration until the subscriber arrives at the target buoy;

the boat device processor sending an arrival communication having a buoy identifier and a subscriber identifier to the server device processor;

the server device processor sending an enable communication to the buoy device processor of the buoy device related to the buoy identifier; and the server device processor billing the subscriber.

2. The buoy reservation system of claim 1 wherein the mooring point is in communication with the buoy device processor.

3. The buoy reservation system of claim 2 wherein the server device processor executes server software.

4. The buoy reservation system of claim 3 wherein the boat device processor executes boat-device software.

5. The buoy reservation system of claim 4 wherein the buoy device processor executes buoy-device software.

6. The buoy reservation system of claim 5 wherein the buoy device processor operates software that receives a remote signal from the server device to enable or disable the mooring point and software that enables or disables the mooring point in response to the remote signal.

7. The buoy reservation system of claim 6 wherein the server device software sends the enable or disable communication in response to a reservation communication from the boat device processor.

8. The buoy reservation system of claim 7 wherein the server device processor operates a database of reservable buoys.

9. The buoy reservation system of claim 8 wherein the server device processor operates a subscriber database that correlates subscribers with boat devices.

10. The buoy reservation system of claim 9 wherein the subscriber database contains subscriber payment information.

11. The buoy reservation system of claim 10 wherein the buoy has local controls.

12. The buoy reservation system of claim 11 wherein signal communication is through the internet.

13. The buoy reservation system of claim 12 wherein the buoy device comprises a wireless device.

14. The buoy reservation system of claim 13 wherein the wireless device is a wireless repeater device.

15. The buoy reservation system of claim 14 further comprising a buoy owner device having a buoy owner device processor in signal communication with the buoy device processor, the boat device processor, and the server device processor.

16. A method of reserving a mooring buoy comprising:

providing a server device comprising a processor;

a boat device comprising a processor; and a buoy device comprising a processor wherein the buoy device processor, the boat device processor, and the server device processor are in signal communication with each other;

the boat device processor sending a reservation communication having a buoy identifier of a target buoy and a subscriber identifier of the subscriber to the server device processor;

the server device processor reserving the target buoy for the subscriber; the server device sending a disable communication to the buoy device processor of the target buoy, wherein the buoy device processor is in signal communication with a lockable mooring point on the buoy device;

the buoy device processor causing the mooring point to enter a mooring disabled configuration until the subscriber arrives at the target buoy;

the boat device processor sending an arrival communication having a buoy identifier and a subscriber identifier to the server device processor;

the server device processor sending an enable communication to the buoy device processor of the buoy device related to the buoy identifier; and the server device processor billing the subscriber.

* * * * *